12;# United States Patent [19]

Goel

[11] Patent Number: 4,558,113

[45] Date of Patent: Dec. 10, 1985

[54] COPOLYMERS OF BICYCLIC AMIDE ACETALS AND POLYISOCYANATES

[75] Inventor: Anil B. Goel, Worthington, Ohio

[73] Assignee: Ashland Oil, Inc., Ashland, Ky.

[21] Appl. No.: 710,651

[22] Filed: Mar. 11, 1985

[51] Int. Cl.[4] ............................................. C08G 18/38
[52] U.S. Cl. ........................................ 528/59; 528/73
[58] Field of Search ................................... 528/59, 73

[56] References Cited

FOREIGN PATENT DOCUMENTS 3235933  3/1984  Fed. Rep. of Germany .

OTHER PUBLICATIONS

Feinauer, *Synthesis*, 1971, pp. 16–26.

*Primary Examiner*—Maurice J. Welsh
*Attorney, Agent, or Firm*—John F. Jones

[57] ABSTRACT

A process for preparing novel polymers having excellent physical properties by the polymerization of (A) a bicyclic amide acetal component and (B) a polyisocyanate component optionally with a small amount of water wherein the bicyclic amide acetal component is composed of two designated different types of bicyclic amide acetal is disclosed.

19 Claims, No Drawings

COPOLYMERS OF BICYCLIC AMIDE ACETALS AND POLYISOCYANATES

The present invention relates to a process for the preparation of improved copolymers of bicyclic amide acetals and polyisocyanates, and more particularly pertains to the use of two types of bicyclic amide acetals and optionally water with a polyisocyanate in the polymerization process to produce polymers having improved physical properties.

The preparation of bicyclic amide acetals is more fully described in the copending U.S. patent applications of Anil B. Goel, Ser. No. 641,238 and Anil B. Goel and Harvey J. Richards, Ser. No. 641,242, both filed on Aug. 16, 1984. The preparation of bicyclic amide acetal-polyisocyanate copolymers at improved rates by the inclusion of water in the polymerization mixture is described in the copending U.S. patent application of Anil B. Goel and Harvey J. Richards, Ser. No. 662,758, filed 10/19/84 and the present invention is an improvement on this copending application.

The reaction of certain bicyclic amide acetals with certain polyisocyanates to produce high molecular weight polymeric products at elevated temperatures has been reported in West German Patent Publication No. 3,235,933.

I have discovered that the use of a mixture of two different types of bicyclic amide acetals as described below in their copolymerization with a polyisocyanate results in polymers which have improved physical properties when compared with the polymers resulting from the polymerization of a polyisocyanate and a single type of bicyclic amide acetal.

The bicyclic amide acetals useful in the process of this invention are those conforming to Formula I

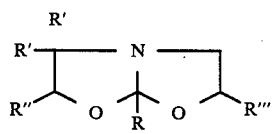

wherein R,R',R" and R'" represent an alkyl, aryl or an alkaryl group having from 1 to 18 carbon atoms, R'" also represents an alkyl ether group having from 2 to 18 carbon atoms or an aryl ether group having from 7 to 13 carbon atoms.

In the process of this invention the two different bicyclic amide acetals which are used in the polymerization mixture along with the polyisocyanate are (1) a bicyclic amide acetal of Formula I wherein R, R' R" and R'" are independently either hydrogen or a group within the foregoing definition having no more than 2 carbon atoms and (2) a bicyclic amide acetal of Formula I wherein at least one of R, R', R" and R'" is a group within the foregoing definition which has at least 7 carbon atoms.

The weight ratio of the two types of bicyclic amide acetals can vary from 98%:2% to 2%:98%.

Polyisocyanates useful in the process of this invention are organic isocyanates having at least two isocyanate groups per molecule. The polyisocyanates can be of low, high or intermediate molecular weight and can be any of a variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least 2 which are more fully disclosed in U.S. Pat. Nos. 3,350,362 and 3,382,215, polyisocyanates which are polymeric in nature including isocyanate prepolymers of all types are included in this invention.

The equivalent ratio of bicyclic amide acetal component to polyisocyanate should be in the range of from about 1/0.8 to ⅓ in the process of this invention. Bicyclic amide acetals are considered to be bifunctional toward the isocyanate functionality.

The rate of polymerization in the process of this invention can be increased by the inclusion in the polymerization mixture a small amount of water if desired.

The polymers resulting from the process of this invention are useful as reaction injection molding materials, composites, coating agents, adhesives and the like.

The process of this invention can be carried out with catalysts, diluents, fillers, pigments, colorants and the like if so desired. The polymerization process of this invention is usually carried out at a temperature in the range of from about 10° to 200° C. and at a pressure in the range of from about 1 to 100 atmospheres.

The process of this invention is further illustrated in the following representative examples.

EXAMPLE 1

A degassed mixture of a bicyclic amide acetal according to Formula I in which R is methyl and R', R" and R'" are hydrogen (48 g) and a bicyclic amide acetal of Formula I in which R is $C_{11}H_{23}$, R' is methyl, R" is hydrogen and R'" is $CH_2OC_4H_9$ (19 g) was mixed with 128.4 g of degassed 4,4'-methylene bis(phenyl isocyanate) and the clear, homogeneous solution was poured into a mold formed from parallel glass plates coated with a silicone mold release agent and held apart by ⅛" spacers. The mold was then heated in an oven at 100° C. for an hour and then heated for two hours at 140° C. The resulting white, opaque polymer was found to have a heat distortion temperature (ASTM D648-56) of 146° C., a notched izod impact strength (ASTM D256) of 0.9 foot pounds per inch of notch and an unnotched izod impact strength of 8 foot pounds/inch.

EXAMPLE 2

This comparative Example is outside the scope of this invention. The procedure of Example 1 was followed using a single bicyclic amide acetal of Formula I wherein R is $C_{11}H_{23}$, R' is methyl, R" is hydrogen and R'" is $CH_2OC_4H_9$ (57 g) and 46 g of the diisocyanate in the polymerization mixture. The final polymer was extremely brittle and the physical properties such as heat distortion temperature, notched izod impact strength and unnotched izod impact strength could not be measured.

EXAMPLE 3

This example is also for comparative purposes and is outside the scope of this patent. The procedure of Example 1 was followed using a single bicyclic amide acetal of Formula I in which R is methyl and R', R" and R'" are hydrogen (65 g) along with 216 g of the diisocyanate in the polymerization mixture. The final polymer was quite brittle and was found to have a heat distortion temperature of 164° C., a notched izod impact strength of 0.2 foot pounds/inch of notch and an unnotched izod impact strength of 4.5 foot pounds/inch.

EXAMPLE 4

The procedure of Example 1 was followed using 48 g of the bicyclic amide acetal of Formula I in which R is methyl and R', R" and R'" are hydrogen, 10 g of the bicyclic amide acetal of Formula I wherein R is $C_{11}H_{23}$, R' is methyl, R" is hydrogen, and R'" is $CH_2OCH_2CH_2CH_2CH_3$ and 120 g of the diisocyanate. The final polymer was found to have a notched izod impact strength of 0.8 foot pounds/inch of notch, an unnotched izod impact strength of 6.6 foot pounds/inch, a heat distortion temperature of 154° C., an ASTM D790 flexural strength of 22,587 psi and flexural modulus of 451,325 psi.

EXAMPLE 5

The procedure of Example 1 was followed using 49 g of the bicyclic amide acetal of Formula I in which R is methyl and R', R" and R'" are hydrogen, 16.2 g of the bicyclic amide acetal of Formula I wherein R is $C_7H_{15}$, R' is methyl, R" is hydrogen and R'" is $CH_2OCH_2CH=CH_2$ and 132 g of the diisocyanate. The final polymer was found to have a heat distortion temperature of 148° C., a notched izod impact strength of 0.5 foot pounds/inch of notch, a flexural strength of 21,810 psi and flexural modulus of 398,118 psi.

EXAMPLE 6

The procedure of Example 1 was followed using 33 g of the bicyclic amide acetal of Formula I in which R is methyl and R', R" and R'" are hydrogen, 11.5 g of the bicyclic amide acetal of Formula I wherein R is $C_{11}H_{23}$, R' is $CH_3$, R" is hydrogen and R'" is $CH_2OCH_2CH=CH_2$ and 86 g of the diisocyanate. The final white, opaque polymer sheet was found to have a heat distortion temperature of 146° C., a notched izod impact strength of 0.7 foot pounds/inch of notch, flexural strength of 20,825 psi and flexural modulus of 438,640 psi.

EXAMPLE 7

This Example is for comparative purposes and is outside the scope of the present invention. The procedure of Example 1 was followed using 61 g of the single bicyclic amide acetal of Formula I wherein R is $C_{11}H_{23}$, R' is methyl, R" is hydrogen, and R'" is $CH_2OCH_2CH=CH_2$, and 52 g of the diisocyanate. The final polymer was too brittle to run any tests for physical properties.

EXAMPLE 8

The procedure of Example 1 was followed using 33 g of the bicyclic amide acetal of Formula I in which R is methyl and R', R" and R'" are hydrogen, 12.2 g of the bicyclic amide acetal of Formula I wherein R and R' are methyl, R" is hydrogen and R'" is $C_{10}H_{21}$ and 86 g of the diisocyanate. The final transparent polymer sheet was found to have a heat distortion temperature of 145° C., a notched izod impact strength of 0.4 foot pounds/inch of notch, a flexural strength of 20,202 psi and a flexural modulus of 500,755 psi.

EXAMPLE 9

The procedure of Example 1 was followed using a mixture of 33 g of the bicyclic amide acetal of Formula I wherein R is $CH_3$ and R', R" and R'" are hydrogen, 10 g of a bicyclic amide acetal of Formula I wherein R is $C_{11}H_{23}$, R' is $CH_3$, R" is hydrogen and R'" is $CH_2OC_4H_9$, and 0.3 g of water along with 83 g of the diisocyanate. The resulting white, opaque polymer was found to have a notched izod impact strength of 0.75 foot pounds/inch of notch, an unnotched izod impact strength of 11.4 foot pounds/inch and a flexural modulus of 384,509 psi.

EXAMPLE 10

The procedure of Example 1 was followed using 33 g of a bicyclic amide acetal of Formula I wherein R" is methyl and R, R' and R'" are hydrogen, 8.1 g of a bicyclic amide acetal of Formula I wherein R" is $C_{11}H_{23}$ and R, R' and R'" are hydrogen, and 83 g of the diisocyanate. The solid polymer which resulted was found to have a heat distortion temperature of 155° C., a notched izod impact strength of 0.5 foot pounds/inch of notch and a flexural modulus of 404,977 psi.

EXAMPLE 11

This example is an attempt to reproduce the reaction between a bicyclic amide acetal and a diisocyanate described in German Pat. No. 3,235,933 and is outside the scope of the present invention. A mixture of 34.8 g of 2,4-diisocyanato toluene and 11.8 g of hexane diol was degassed at 60° C. under reduced pressure and then was mixed with 25.8 g of methyl substituted bicyclic amide acetal (Formula I wherein R is methyl and R', R" and R'" are hydrogen). The resulting viscous solution was poured into a mold as in Example 1 and cured. The resulting sample was full of bubbles and was so brittle that it was impossible to measure the usual physical properties such as impact strength, HDT, tensile modulus, etc. The sample was easily broken by hand.

I claim:

1. The process for preparing polymers having improved physical properties comprising polymerizing a mixture of (A) a bicyclic amide acetal component and (B) a polyisocyanate component said bicyclic amide acetal component conforming to the Formula

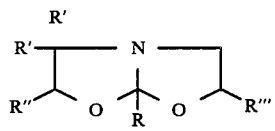

and being composed of both types (1) and (2), type (1) being characterized in that R, R', R" and R'" independently represent hydrogen or a hydrocarbon group having no more than 2 carbon atoms and type (2) being characterized in that R, R', R" and R'" represent hydrogen or an alkyl, aryl or an alkaryl group having from 1 to 18 carbon atoms and R'" also represents an alkyl ether group having from 2 to 18 carbon atoms or an aryl ether group having from 7 to 13 carbon atoms and wherein at least one of R, R', R" and R''' is a group having at least 7 carbon atoms.

2. The process of claim 1 wherein the equivalent ratio of bicyclic amide acetal component to polyisocyanate is in the range of from about 1/0.8 to ⅓.

3. The process of claim 2 wherein the polymerization is carried out in a temperature range of from about 10° to 200° C. and at a pressure in the range of from about 1 to 100 atmospheres.

4. The process of claim 3 wherein the polyisocyanate is a diisocyanate.

5. The process of claim 4 wherein the weight ratio of bicyclic amide acetal(1) to bicyclic amide acetal(2) is in the range of from 98%:2% to 2%:98%.

6. The process of claim 5 wherein the bicyclic amide acetal(1) is one in which R is methyl and R', R" and R''' are hydrogen, bicyclic amide acetal(2) is one in which R is $C_{11}H_{23}$, R' is methyl, R" is hydrogen and R''' is $CH_2OC_4H_9$ and the diisocyanate is 4,4'-methylene bis(phenyl isocyanate).

7. The process of claim 5 wherein the bicyclic amide acetal(1) is one in which R is methyl and R', R" and R''' are hydrogen, the bicyclic amide acetal(2) is one in which R is $C_7H_{15}$, R' is methyl, R" is hydrogen and R''' is $CH_2OCH_2CH=CH_2$ and the diisocyanate is 4,4'-methylene bis (phenyl isocyanate).

8. The process of claim 5 wherein the bicyclic amide acetal(1) is one in which R is methyl and R', R" and R''' are hydrogen, the bicyclic amide acetal(2) is one in which R is $CH_{11}H_{23}$, R' is methyl, R" is hydrogen and R''' is $CH_2OCH_2CH=CH_2$ and the diisocyanate is 4,4'-methylene bis(phenyl isocyanate).

9. The process of claim 5 wherein the bicyclic amide acetal(1) is one in which R is methyl and R', R" and R''' are hydrogen, the bicyclic amide acetal(2) is one in which R and R' are methyl, R" is hydrogen and R''' is $C_{10}H_{21}$ and the diisocyanate is 4,4'-methylene bis(phenyl isocyanate).

10. The process of claim 5 in which there is also included a small amount of water.

11. The polymer resulting from the polymerization of a mixture of (A) a bicyclic amide acetal component and (B) a polyisocyanate component said bicyclic amide acetal component conforming to the formula:

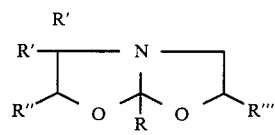

and being composed of types (1) and (2), in type (1) being characterized in that R, R', R" and R''' independently represent hydrogen or a hydrocarbon group having no more than 2 carbon atoms and type (2) being characterized in that R, R', R" and R''' represent hydrogen, an alkyl aryl or an alkaryl group having from 1 to 18 carbon atoms and R''' also represents an alkyl ether group having from 2 to 18 carbon atoms or an aryl ether group having from 7 to 13 carbon atoms and wherein at least one of R, R', R" and R''' is a group having at least 7 carbon atoms.

12. The polymer of claim 11 wherein the equivalent ratio of bicyclic amide acetal component to polyisocyanate is in the range of from about 1/0.8 to ⅓.

13. The polymer of claim 12 wherein the polymerization is carried out in a temperature range of from about 10° to 200° C. and at a pressure in the range of from about 1 to 100 atmospheres.

14. The polymer of claim 13 wherein the polyisocyanate is a diisocyanate.

15. The polymer of claim 14 wherein the weight ratio of bicyclic amide acetal(1) to bicyclic amide acetal(2) is in the range of from 98%:2% to 2%:98%.

16. The polymer of claim 15 wherein the bicyclic amide acetal(1) is one in which R is methyl and R', R" and R''' are hydrogen, bicyclic amide acetal(2) is one in which R is $C_{11}H_{23}$, R' is methyl, R" is hydrogen and R''' is $CH_2OC_4H_9$ and the diisocyanate is 4,4'-methylene bis(phenyl isocyanate).

17. The polymer of claim 15 wherein the bicyclic amide acetal(1) is one in which R is methyl, R', R" and R''' are hydrogen, the bicyclic amide acetal(2) is one in which R is $C_7H_{15}$, R' is methyl, R" is hydrogen and R''' is $CH_2OCH_2CH=CH_2$ and the diisocyanate is 4,4'-methylene bis(phenyl isocyanate).

18. The polymer of claim 15 wherein the bicyclic amide acetal (1) is one in which R is methyl and R', R", and R''' are hydrogen, the bicyclic amide acetal(2) is one in which R is $C_{11}H_{23}$, R' is methyl, R" is hydrogen and R''' is $CH_2OCH_2CH=CH_2$ and the diisocyanate is 4,4'-methylene bis(phenyl isocyanate).

19. The polymer of claim 15 wherein the bicyclic amide acetal(1) is one in which R is methyl and R', R" and R''' are hydrogen, the bicyclic amide acetal(2) is one in which R and R' are methyl, R" is hydrogen and R''' is $C_{10}H_{21}$ and the diisocyanate is 4,4'-methylene bis(phenyl isocyanate).

* * * * *